United States Patent [19]

Pardo

[11] Patent Number: 5,717,840
[45] Date of Patent: Feb. 10, 1998

[54] METHOD AND APPARATUS FOR PRINTING ACCORDING TO A GRAPHIC LANGUAGE

[75] Inventor: Luis Trabb Pardo, Palo Alto, Calif.

[73] Assignee: Canon Kabushiki Kaisha, Tokyo, Japan

[21] Appl. No.: 595,168

[22] Filed: Feb. 1, 1996

Related U.S. Application Data

[62] Division of Ser. No. 911,030, Jul. 8, 1992, Pat. No. 5,515,481.

[51] Int. Cl.$^6$ .................................................. G06K 15/00
[52] U.S. Cl. .................................................. 395/112; 395/115
[58] Field of Search .................................. 395/112, 114, 395/101, 109, 117, 138, 140, 141, 133, 115, 116, 147, 148, 102, 110, 507, 509, 497.01, 497.02, 674, 670, 128, 523, 113, 497.03; 382/299, 298; 358/404, 445, 444, 448, 426, 261.1

[56] References Cited

U.S. PATENT DOCUMENTS

| | | | |
|---|---|---|---|
| 3,895,184 | 7/1975 | Komura et al. | 358/261.1 |
| 4,992,958 | 2/1991 | Kageyama et al. | 395/116 |
| 5,068,805 | 11/1991 | Tsuzuki | 395/523 |
| 5,122,973 | 6/1992 | Venner et al. | 395/117 |
| 5,129,049 | 7/1992 | Cuzzo et al. | 395/113 |
| 5,140,674 | 8/1992 | Anderson et al. | 395/117 |
| 5,159,681 | 10/1992 | Beck et al. | 395/116 |
| 5,206,741 | 4/1993 | Shimura et al. | 358/404 |
| 5,220,674 | 6/1993 | Morgan et al. | 395/800 |
| 5,257,097 | 10/1993 | Pineau et al. | 358/500 |
| 5,293,463 | 3/1994 | Masuda | 395/101 |
| 5,303,334 | 4/1994 | Snyder et al. | 395/109 |
| 5,333,246 | 7/1994 | Nagasaka | 395/133 |
| 5,502,804 | 3/1996 | Butterfield et al. | 395/147 |

*Primary Examiner*—Edward L. Coles, Sr.
*Assistant Examiner*—Dov Popovici
*Attorney, Agent, or Firm*—Fitzpatrick, Cella, Harper & Scinto

[57] ABSTRACT

Printing in which printer resources that are consumed in forming a raster image are predicted and in which those printer resources are re-allocated in a case where printer resources are predicted to be exceeded. Specifically, coded print data such as coded print data in a page description language is input, the coded print data is translated into a first coded representation, and the first coded representation is translated into a second coded representation which is different from the first coded representation. Printer resources consumed in forming a raster image corresponding to the coded print data in the second coded representation are predicted, and printer resources are re-allocated in a case where printer resources are predicted to be exceeded. A raster image is thereafter formed from the second coded representation.

8 Claims, 11 Drawing Sheets

METHOD AND APPARATUS FOR PRINTING ACCORDING TO A GRAPHIC LANGUAGE

This application is a division of application Ser. No. 07/911,030 filed Jul. 8, 1992, allowed, now U.S. Pat. No. 5,515,418.

BACKGROUND OF THE INVENTION

1. Field of the Invention

The present invention relates to a method and apparatus for printing an image in accordance with a graphics language stream in which graphic descriptions for frames in a page are separated from document layout information which describes how the frames are placed on the page, and in which the graphic descriptions and the document layout information are output on separate, pipelined, interfaces. A graphics language processor is provided to intercept the graphics language stream. The processor separates the graphics language stream into mask information and background information against which the masks are applied, operates independently on the mask and background information to create frame rasters, and uses the document layout information to map the frame rasters onto the page.

2. Description of the Related Art

Recently, high quality raster-based devices, such as laser beam printers and ink jet or bubble jet printers and the like, have become widely available. These devices receive image data from a host computer and generate a raster image in bit map memory for subsequent imaging and/or printing.

FIG. 1 shows the rasterization process by which each pixel in bit map memory is formed, and by which qualities (such as color, grey level or half toning) are given to each pixel. As shown in FIG. 1, the bit map raster 100 is divided into frames F which define areas in the bit map raster. For each pixel 101 in the frame, a mask M and a background B are defined. The mask M defines whether or not the pixel should be rendered into bit map memory and the location where the pixel should be rendered. The background B defines the qualities with which the pixel 101 should be rendered. For example the background B may comprise a color associated with the pixel or it may comprise a halftone density. If desired, a clipping region may also be defined to specify the effective areas of the mask and allow more precise control over the masks. The rasterization of pixel 101 in the bit map memory is the intersection of the frame information, the background information, clipping region information, and mask information, all as illustrated in FIG. 1.

As the versatility of raster printing devices increases, more sophisticated techniques for instructing how to form the raster image have been developed. That is, it is not ordinarily practical to transmit a full raster image to the printer. Rather a descriptive language such as page description language ("PDL") is used. A page description language is a series of commands that describes all characteristics of each element on every page of the document, such as text, graphics, scanned images. The PDL may also include information that describes document layout and sheet handling (collation, etc.). The host computer transmits page description language to the printing device, and the device interprets the page description language so as to render the raster image.

FIG. 2 is illustrative of this process. FIG. 2 depicts modules in a printing device which accept page description language at one end and create a bit map raster image at the other end. As shown in FIG. 2, a communication interface module 102 receives PDL commands and passes them to a PDL interpreter 104. The PDL interpreter directs PDL commands to a graphic layer 105, a font module 106, and a storage pool 107 as appropriate to the particular PDL command being processed by the interpreter. A rasterizer 109 accepts output from the graphic layer and the font module and the storage pool, and forms a raster image in a bit map raster memory. Specifically, the rasterizer 109 accepts an empty raster from bit map raster pool 110 and returns a filled raster to the raster pool. The filled raster is imaged by the printing device during which time a further empty raster (corresponding to a succeeding page) is being filled by rasterizer 109.

Printer commands like PDL commands are normally device-independent which means that the final document will look the same for the same PDL commands regardless of the printing device that receives the PDL commands. While this is advantageous in some respects, it has caused difficulty in that each different printer, because of its own unique characteristics, must be designed with its own unique PDL interpreter 104 which translates device-independent PDL commands into corresponding raster images.

SUMMARY

It is an object of the present invention to address the foregoing difficulties.

In one aspect, the invention generates graphic language document description commands based on print commands that include device-independent print commands. Frame descriptions for raster frames in the document are generated from the print commands as are document layout commands which define how the raster frames are positioned on the page raster. The frame descriptions are output on a first pipelined interface and the document layout commands are output on a second pipelined interface. The document layout commands may include information as to how frames are mapped onto a sheet of paper, and may also include document finishing instructions such as stapling and collation instructions. The frame descriptions may be raster-based descriptions and are ordinarily device-dependent. The invention may be embodied in a raster-based printing or display device such as a laser beam printer or ink jet or bubble jet printer, but it also may be embodied in a printer driver in a host computer and executed as part of host computer processes.

In another aspect, the invention is a graphics language processor that includes a mask generator for generating pixel mask objects in a frame. A background generator is provided for generating backgrounds against which the objects are applied. An interpreter interprets a stream of graphic language commands input to the processor and activates the mask generator and the background generator in accordance with the graphics language. A rasterizer applies the mask objects to the background onto a bit map raster memory. The mask generator may include plural different mask generators and those plural mask generators may be organized into pipelined structures so as to be activated, in accordance with the graphics language, by the interpreter. Likewise, the background generator may include plural background generators, each of which generates a different kind of background, and each of those background generators may be organized into pipelined structures so as to be activated by appropriate graphics language commands through the interpreter. A coordinator may be provided for coordinating the pipeline among the structures. The mask objects generated by the mask generator may be primitive objects which are compact representations of the pixel objects, or the mask objects may be segments of bit map images. If desired, a clipper may be provided so as to clip the output of the mask generator. Likewise, in certain embodiments, a dispatcher may be employed so as to sequentially select raster areas and to cause the mask generator and the background generator and the rasterizer to operate on the selected raster areas, respectively. For example, the dispatcher may cause banded partitions of the raster to be sequentially selected and operated on by the mask generator and the background generator and the rasterizer.

In another aspect, the invention is a printing method comprising the steps of inputting coded print data such as PDL print commands, translating the coded print data into a first coded representation, translating the first coded representation into a second coded representation which is different from the first coded representation, and forming a raster image from the second coded representation. The first and second coded representations may include common code primitives, and the second coded representation may be susceptible of accurate modeling such that usage of the printer resources in rasterizing the representation may be predicted accurately so that the rasterization process may be changed should there be insufficient printing resources available.

This brief summary has been provided so that the nature of the invention may be understood quickly. A fuller understanding of the invention may be obtained by the following description in conjunction with the remaining drawings in which:

BRIEF DESCRIPTION OF THE DRAWINGS

FIGS. 7, 8 and 9 are view showings different forms of the graphics language processor, in which FIG. 7 is a sequential processor, FIG. 8 is a banded processor, and FIG. 9 is a pipelined processor.

DETAILED DESCRIPTION OF THE PREFERRED EMBODIMENT

Figure 3:
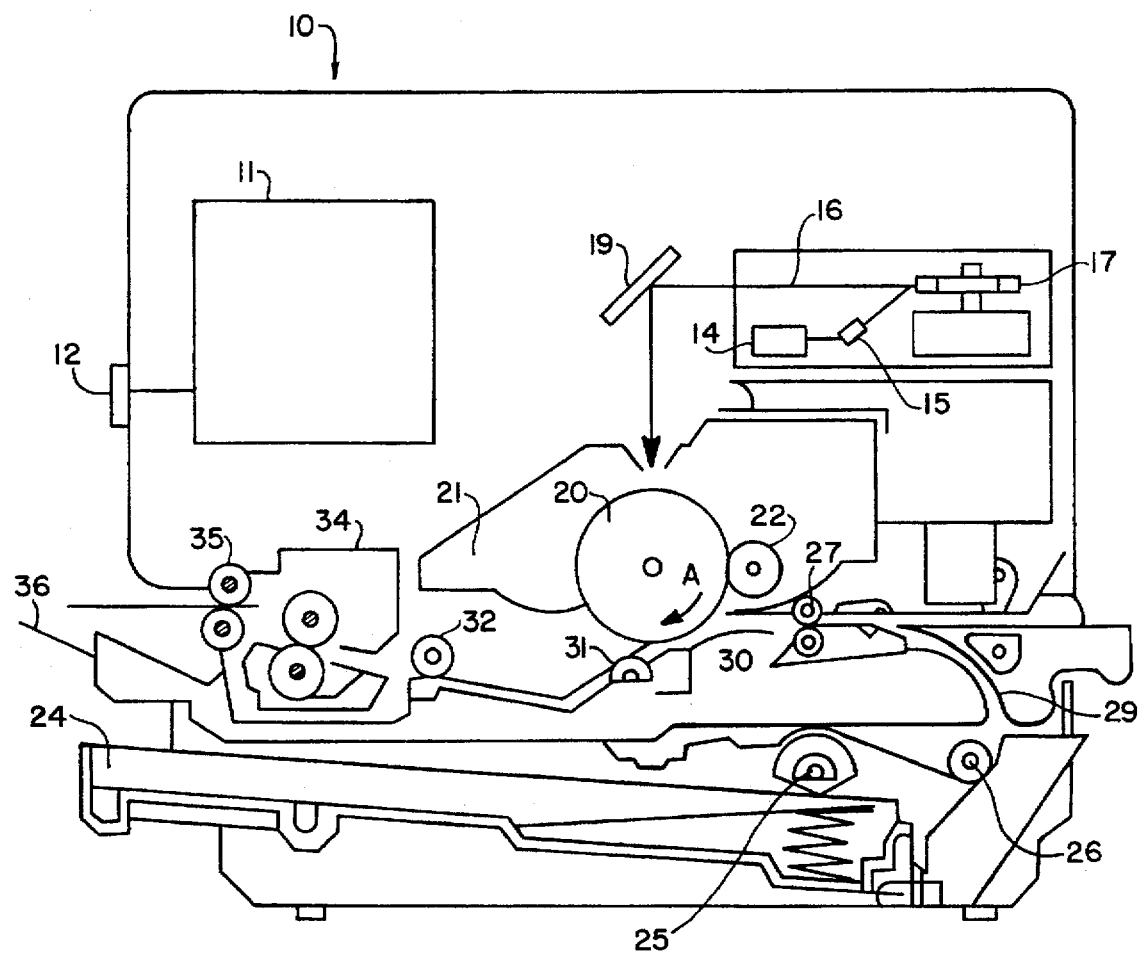
FIG. 3 is a printer according to the invention.

FIG. 3 is a laser beam printing apparatus according to the invention.

As shown in FIG. 3, laser beam printer 10 includes a controller 11 which controls the various mechanical and electrical functions within the printer. In particular, controller 11 accepts image data that is derived by an unshown host computer through communication port 12 and processes the image data so as to derive a laser modulation signal that is applied to laser driver 14. The image data from communication port 12 is preferably in a very compact form such as a page description language ("PDL") which merely defines objects and the objects' location on the page rather than defining a full raster image of the print image, but any form for the image data can used. In accordance with the image signal provided by controller 11, laser driver 14 drives laser 15 so as to cause it to emit a laser beam 16. A rotatable polygonal mirror 17 scanningly deflects laser beam 16 via mirror 19 onto the surface of photosensitive drum 20. Photosensitive drum 20 is rotated in the direction of arrow A past charger 21. The scanningly deflected laser beam 16 forms a latent image on the surface of the charged photosensitive drum, and the latent image is developed into a toner image at developer 22.

In coordination with scanning the surface of drum 20, controller 11 causes the topmost sheet of paper from stack 24 to be fed by pickup roller 25 and conveyed by rollers 26 and 27 through image passageway 29 to photosensitive drum 20. The toner-developed latent image on drum 20 is transferred to this sheet by transfer charger 30 and conveyed by rollers 31 and 32 to fixing device 34. In fixing device 34, a combination of heat and pressure fixes the toner image permanently on the sheet and the sheet is ejected by rollers 35 onto output tray 36.

Figure 2:
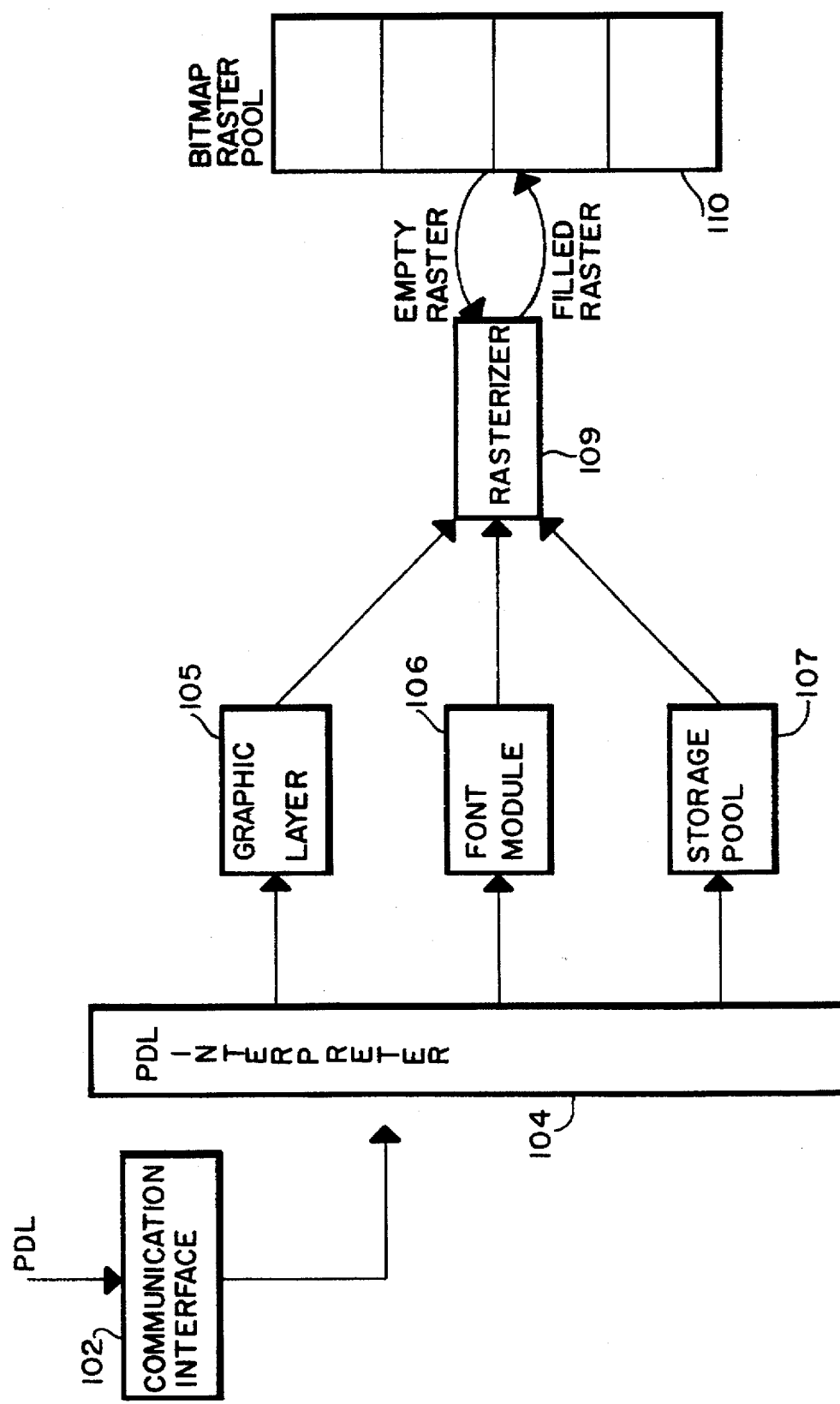
FIG. 2 is a depiction of a PDL printer process.
Figure 4:
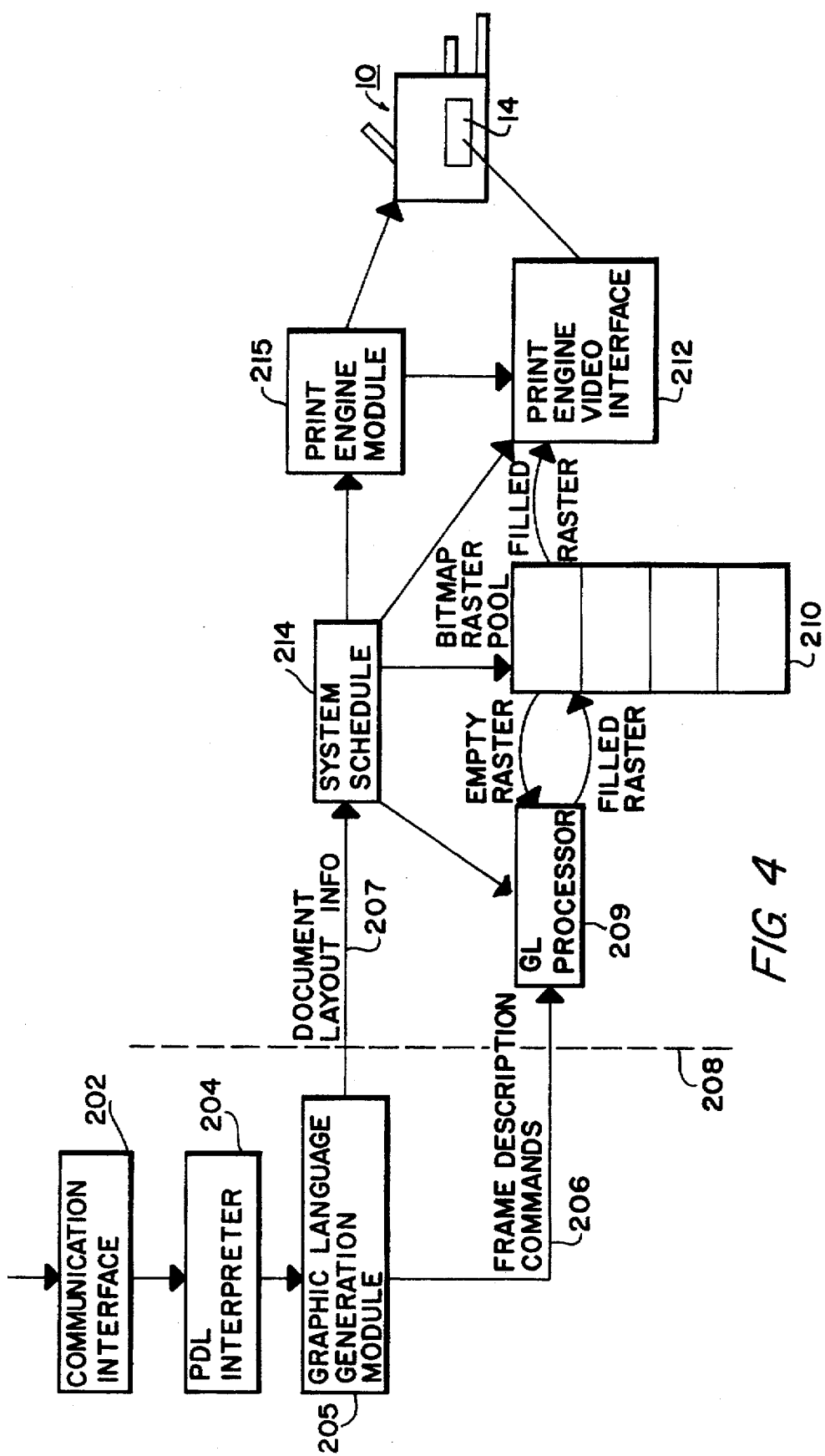
FIG. 4 depicts a graphics language processor according to the invention.

FIG. 4 is a view showing controller 11. In FIG. 4, communication interface 202 and PDL interpreter 204 are substantially similar to the communication interface and PDL interpreter shown in FIG. 2, and descriptions thereof have been omitted.

As shown in FIG. 4, page description language is passed from PDL interpreter 204 to graphic language generation module 205. Graphic language generation module 205 translates PDL into a graphics language document according to the invention. In particular, in accordance with the PDL language, graphic language generation module 205 generates the graphics language document into two parts. First, the graphics language generation module 205 generates frame description commands in graphics language as shown at 206. The frame description commands describe raster frames as a sequence of primitive raster operations. Thus, the frame description commands define objects and rules on how to apply the objects onto the raster frames. For example, the frame description commands might instruct the graphic language processor to place a box-shaped set of pixels over a color image background and to position the resulting pixels at a specific location in bit map raster memory. Or the frame commands might instruct the graphics language processor to form a corporate letterhead as a first frame, a text image comprising a letter as a second frame, and an image of a signature as a third frame. Frame description commands are described more fully below.

As further shown in FIG. 4, the second output of graphic language generation module 205 is document layout information 207. Document layout information describes how to apply the frames defined by frame description commands 206 onto a bit map raster that corresponds to a document page. Specifically, the document layout information includes information as to how the frames are mapped onto the raster memory. For example, document layout commands might command the graphic language processor to map several frames onto different and possibly overlapping positions in the bit map raster for a page. In the case of printable documents, the document layout information may include specialized printing instructions such as duplex printing, and it may also include paper sheet handling and finishing instructions, such as stapling and collation instructions.

The graphic language commands 206 and the document layout information 207 are output on the pipelined outputs across interface 208. Interface 208 may be a physical interface between discrete devices such as the interface between a host CPU and a print engine. For example, it is possible to implement communication interface 202, PDL interpreter 204, and graphic language generation module 205 as a printer driver in a host CPU. In that case, page description language commands that are generated in the host computer are also converted into graphic language commands 206 and document layout information 207 and are output across a pipelined interface directly to a printer engine. In the embodiment described here, however, interface 208 is an interface between two modules in controller 11. The modules may be implemented either in software or in hardware.

Graphic language commands 206 are input to graphic language processor 209 which renders the graphic language commands into an empty raster that is provided from bit map raster pool 210. The filled raster is provided to a print engine video interface 212 which provides the input to laser driver 14 of the printer.

Document layout information 207 is provided to system scheduler 214 which coordinates operation of the various modules. In particular, system scheduler 214 provides an empty raster from bit map raster pool 210 to the graphic language processor 209 and instructs the graphics language processor to begin rendering pixel images into the raster. When the graphic language processor 209 completes rendering the raster image, system scheduler 214 instructs print engine video interface 212 to begin providing data to laser driver 14 in accordance with the rendered raster image. In synchronism with modulating the laser beam, system scheduler 214 instructs print engine module 215 to begin operation of the various mechanical aspects of printer 10, such as sheet feeding, drum rotation and roller fixing. System scheduler 214 also instructs duplex printing, paper output, stapling, collation and other document finishing information in accordance with the document layout information 207.

Figure 1:
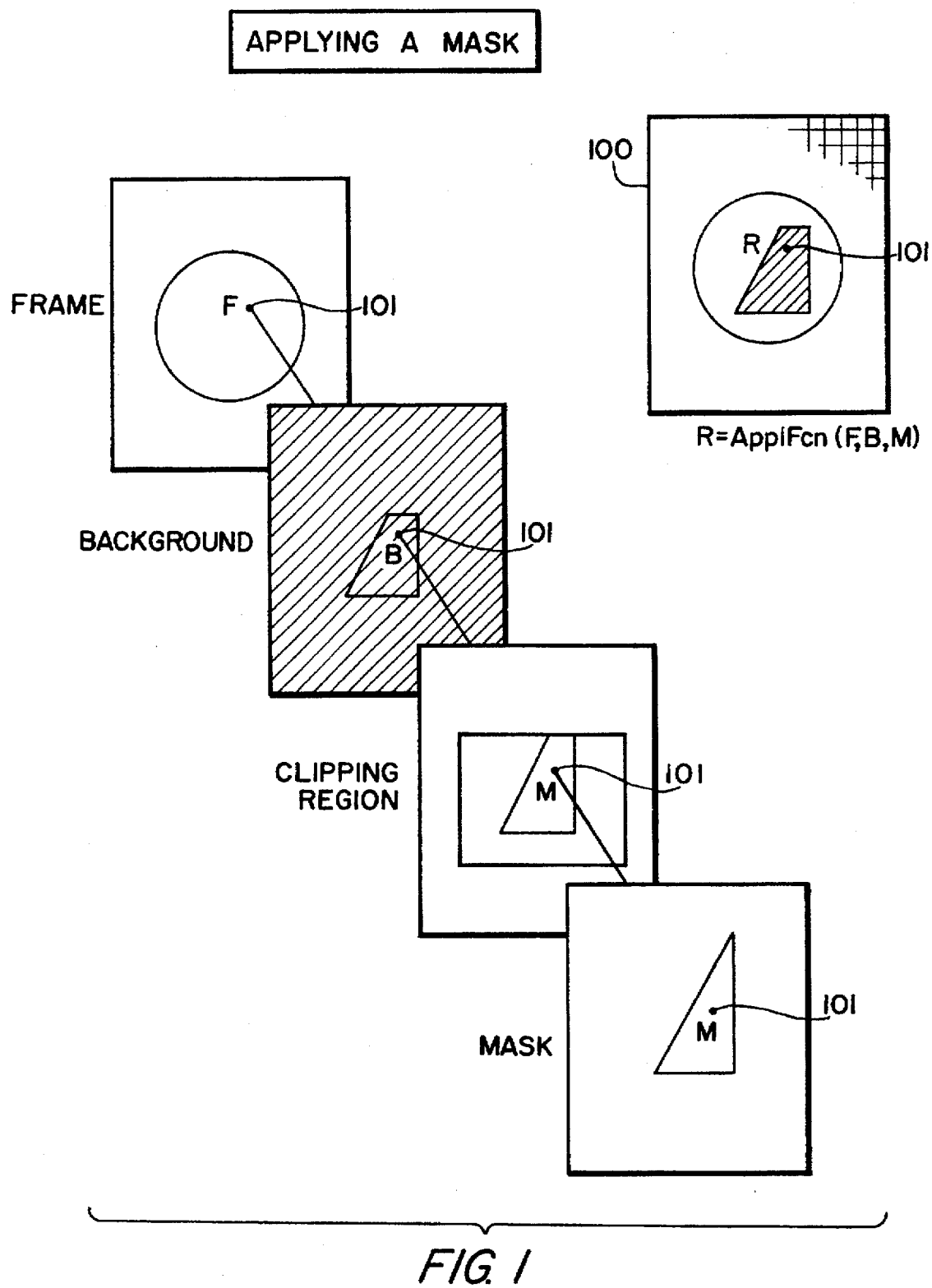
FIG. 1 is an illustration showing a rasterization of pixels in a bit map raster memory.
Figure 5:
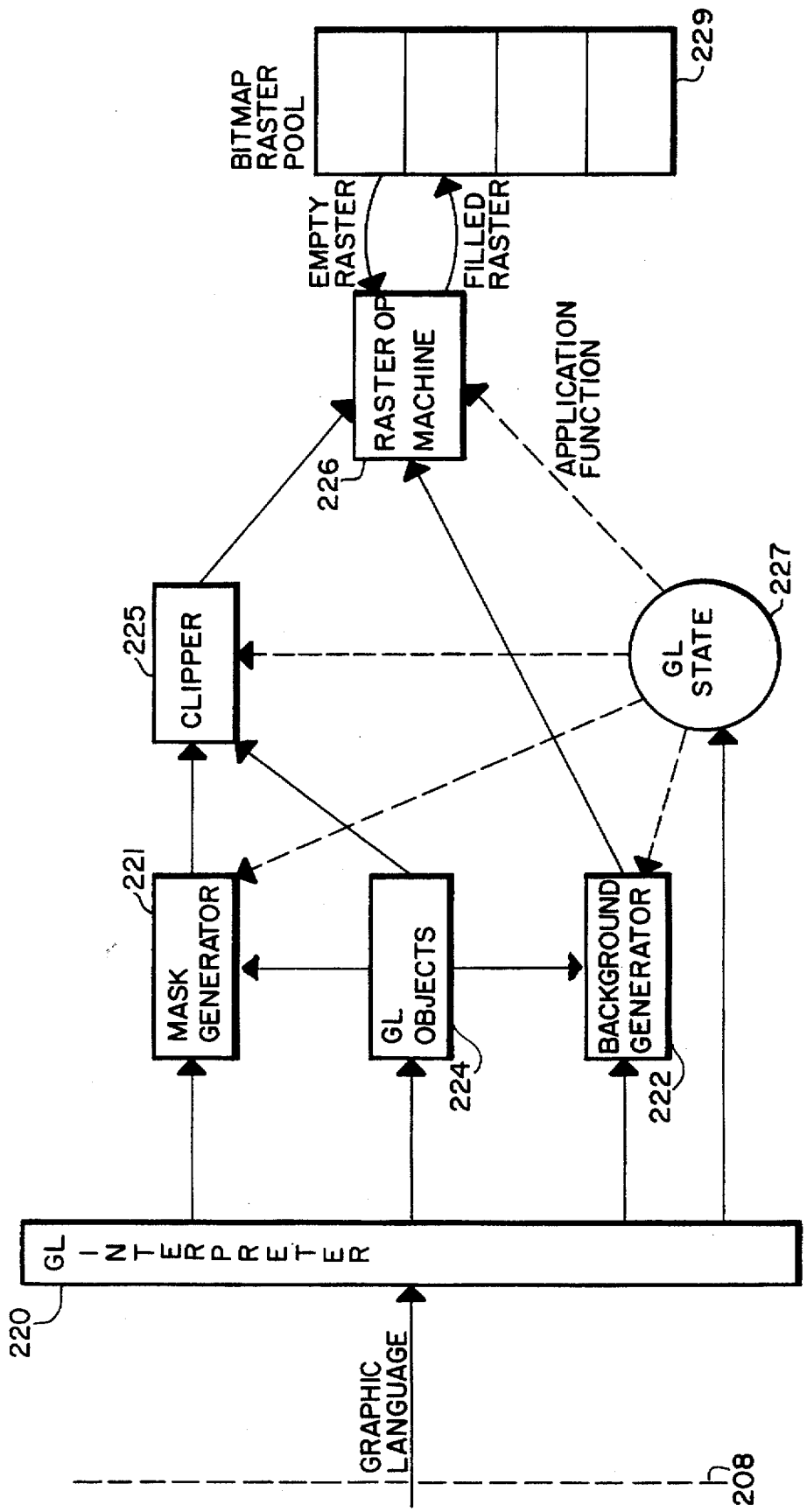
FIG. 5 is a diagram for illustrating the interface between the page description language and a graphics language according to the invention.

FIG. 5 is a detailed view of the graphic language processor 209. As seen there, the processor 209 includes a graphic language interpreter 220 which parses a stream of graphic language commands and interprets the graphics language commands. In particular, the graphic language interpreter stores graphic language objects 224 as those objects are encountered in the stream of graphic language commands. The interpreter also passes mask application commands to mask generator 221 and passes background generation commands to background generator 222 as those commands are encountered in the stream of graphics language commands. Mask generator 221 generates mask information such as mask M shown in FIG. 1; likewise, background generator 222 generates background information such as background B shown in FIG. 1. Both mask generator 221 and background generator 222 draw upon graphic language objects stored in GL object storage 224.

The masks generated by mask generator 221 are passed to clipper 225 which clips the masks, if desired, in accordance with the GL commands. Clipper 225 also draws upon graphic language objects stored in GL object storage 224.

Figure 5A:
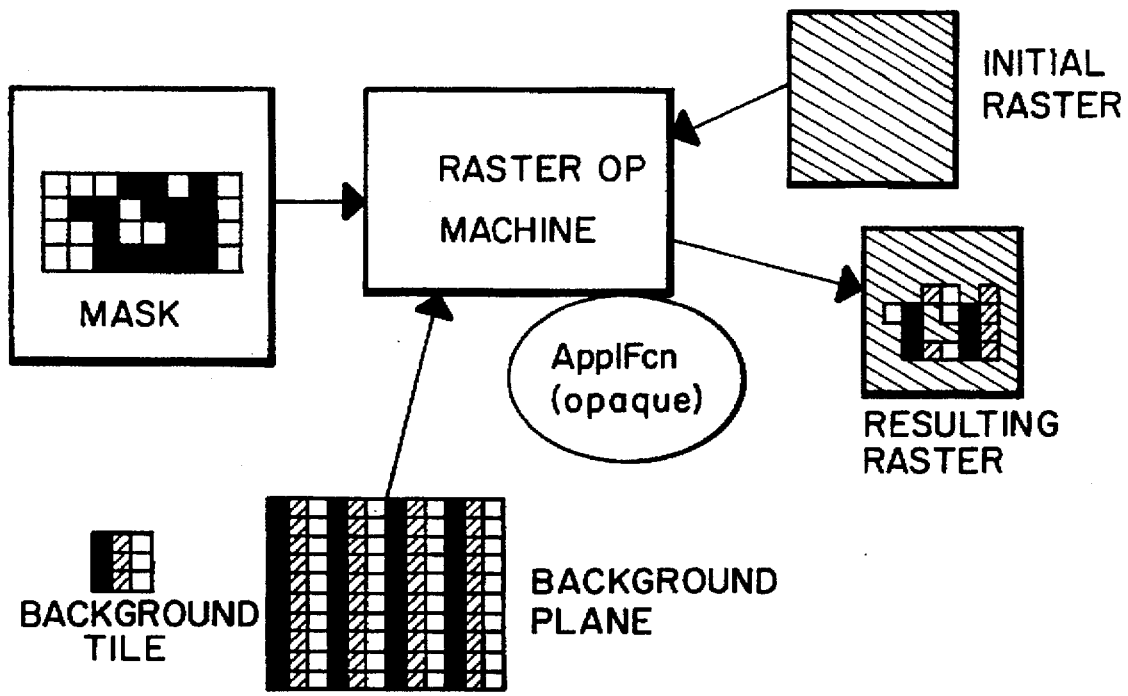
FIG. 5(a) is a diagram illustrating how a mask is applied against a background onto a raster.

The output of clipper 225 and the output of background generator 222 is provided to rasterOP machine 226. RasterOP machine 226 functions to apply the mask generated by mask generator 221, as clipped by clipper 225, onto the background generated by background generator 222. The rasterOP machine applies the mask in accordance with an application function defined by GL state memory 227. For example, as shown in FIG. 5A, an opaque application function has been specified. Accordingly, when the rasterOP machine applies the mask generated by generator 221 and clipped by clipper 225 onto the background plane generated by generator 222, any information in the initial raster is obliterated when forming the resulting raster. Other application functions are possible, for example, transparent application functions or additive application functions.

The raster on which the rasterOP machine 226 operates is provided from a bit map raster pool 229 as coordinated by system scheduler 214. When all applications have been finished, as set forth in the document layout information 207, the rasterOP machine provides a filled raster back to the bit map raster pool and the filled raster is printed by printer 10.

Figure 6:
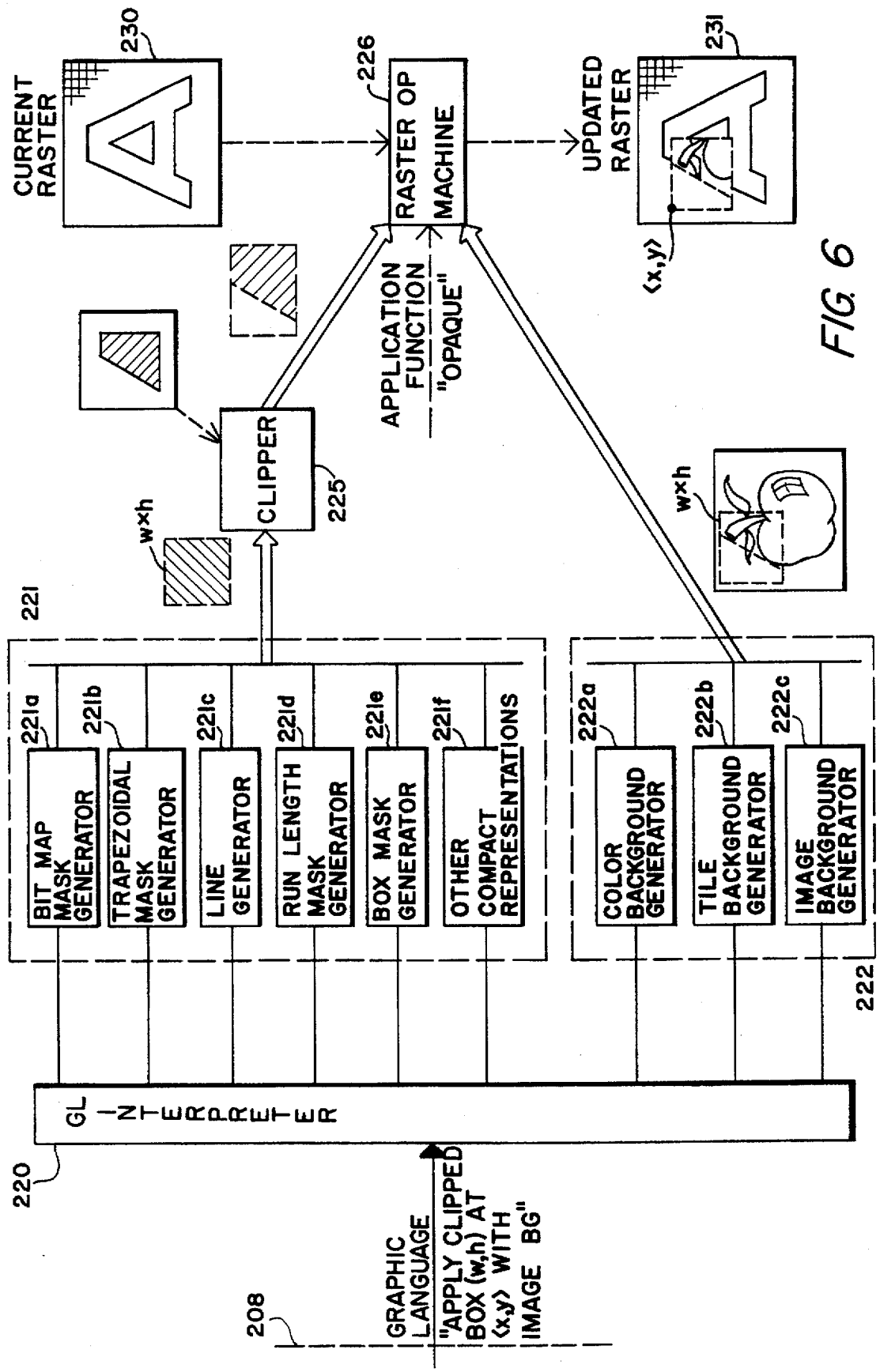
FIG. 6 is a detailed view showing mask generators and background generators according to the graphics language processor of the invention.

FIG. 6 is a detailed conceptual view showing the construction of mask generator 221 and background generator 222, as well as showing the application process of rasterOP machine 226. In FIG. 6, some of the elements shown in FIG. 5 have not been depicted so as to simplify the following presentation.

As shown in FIG. 6, mask generator 221 includes several mask generators that have been designed specifically to produce specialized pixel primitive objects. In particular, mask generator 221 includes a bit map mask generator 221a, a trapezoidal mask generator 221b, a line generator 221c, a run length mask generator 221d, a box mask generator 221e, and a generator 221f that generates other compact representations. In more detail, bit map mask generator 221a produces a bit map mask in response to GL commands from GL interpreter 220. Bit map masks are bit-for-bit pixel representations of a mask.

Trapezoidal mask generator 221b generates a trapezoidal-shaped mask in response to GL commands from GL interpreter 220. Trapezoidal masks define trapezoidal objects in raster memory.

Line generator 221c generates line drawings of specified thickness in response to GL commands from GL interpreter 220.

Run length mask generator 221d encodes run length masks based on the run length of pixels within the mask.

Box mask generator 221e generates a box-shaped bask of specified width and height in response to commands from GL interpreter 220.

Other compact representations are possible, and the above set should not be viewed as limiting, but rather only as representative of the types of masks generated by mask generator 221.

Background generator 222 includes color background generator 222a, tile background generator 222b, and image background generator 222c.

In more detail, color background generator 222a responds to GL commands from GL interpreter 220 and generates a solid color background of specified color.

Tile background generator 222b generates and replicates a tile specified by GL interpreter 220. The tile pattern is replicated across the entire background in the area specified by the GL interpreter.

Image background generator 222c provides an image background in a pixel-for-pixel format as specified by GL interpreter 220.

Other background generators are possible, and the above list should be viewed not in a limiting sense, but rather only as representative of the type of background generators that may be included in background generator 222.

FIG. 6 also illustrates how a current raster 230 is updated by rasterOP machine 226 in response to graphic language commands so as to produce updated raster 231. As shown in FIG. 6, GL interpreter 220 has received the graphic language command "apply clipped box (W,H) at <x,y> with image background". (A full list of graphic language commands is given in Appendix A.) In response to the first portion of the graphic language command, namely "apply clipped box (W,H)", the GL interpreter 220 activates box mask generator 221e. Box mask generator 221e generates a box-shaped mask of width W and height H as depicted illustratively at the output of mask generator 221. Thereupon, clipper 225 draws upon the graphic language objects stored in memory 224 to provide a clipped shape as depicted illustratively adjacent clipper 225. The resulting clipped box is provided to rasterOP machine 226.

In response to the later portion of the graphic language command, namely "with image background", GL interpreter 220 activates image background generator 222c. The image background generator 222c draws upon the graphic language objects stored in memory 224 and provides the image background, which may be a color image background, to rasterOP machine 226.

In response to the information provided by clipper 225 and background generator 222, rasterOP machine 226 applies the clipped mask to the background in accordance with the application function specified by state memory 227. Here, the application function is specified by "opaque", in accordance with which the rasterOP machine 226 applies the masked and clipped area of the background at position <x,y> of the current raster so as to obtain the updated raster shown at 231. The foregoing steps are performed for each command in the stream of graphic language commands for each frame, after which the document layout information 207 is utilized to determine how the frame is applied to the overall bit map raster.

Figure 7:
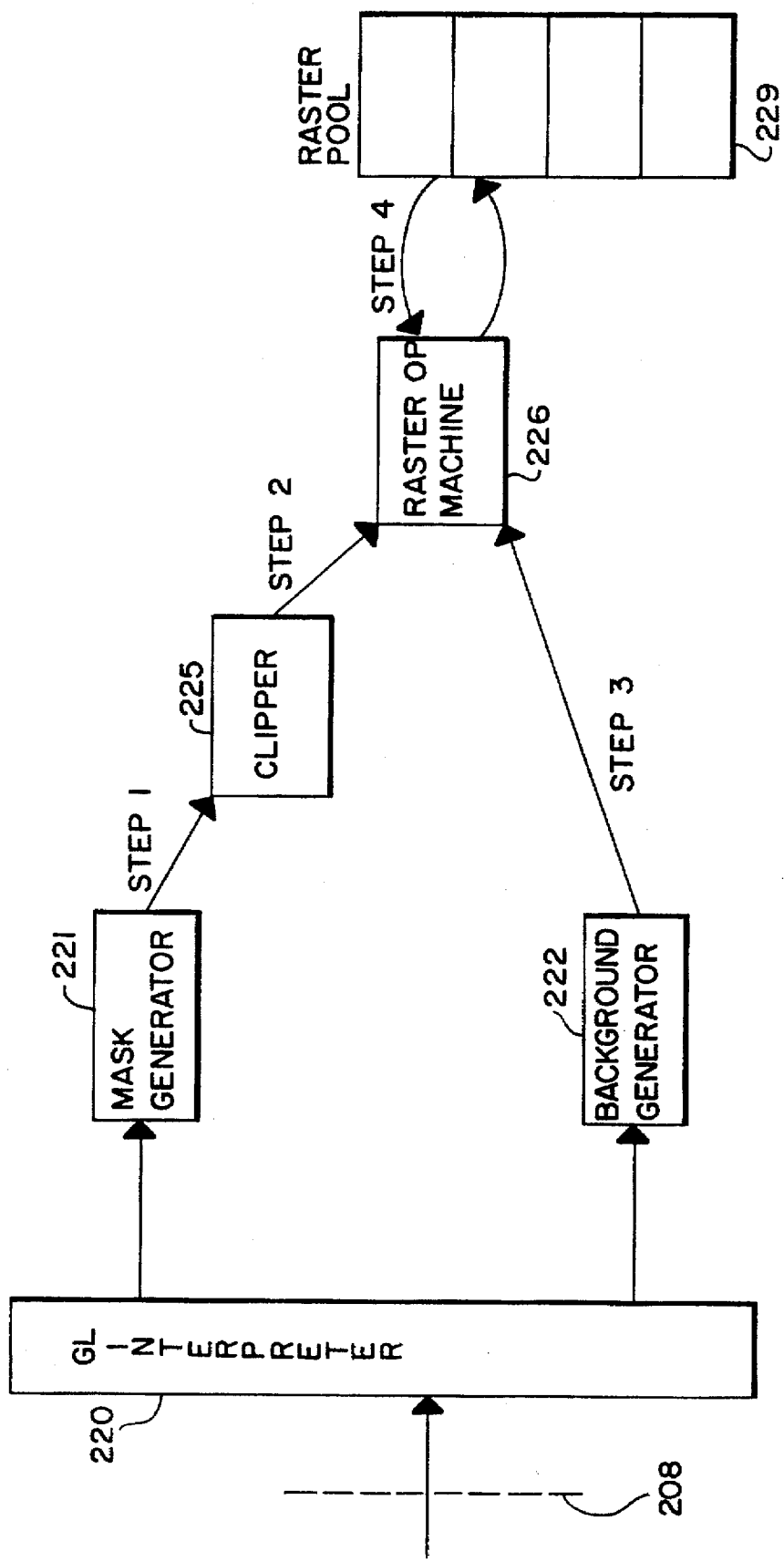

FIG. 6 has been explained as if the process were a sequential process, as depicted in FIG. 7. That is, in step 1, mask generator 221 generates a mask that is provided to clipper 225. In step 2, clipper 225 clips the mask appropriate and provides it to rasterOP machine 226. In step 3, background generator 222 provides a background to rasterOP machine 226, and in step 4, rasterOP machine 226 applies the mask to the background and writes it into the raster image in the bit map raster memory. While this is one possible implementation of the graphic language processor, other implementations are possible.

Figure 8:
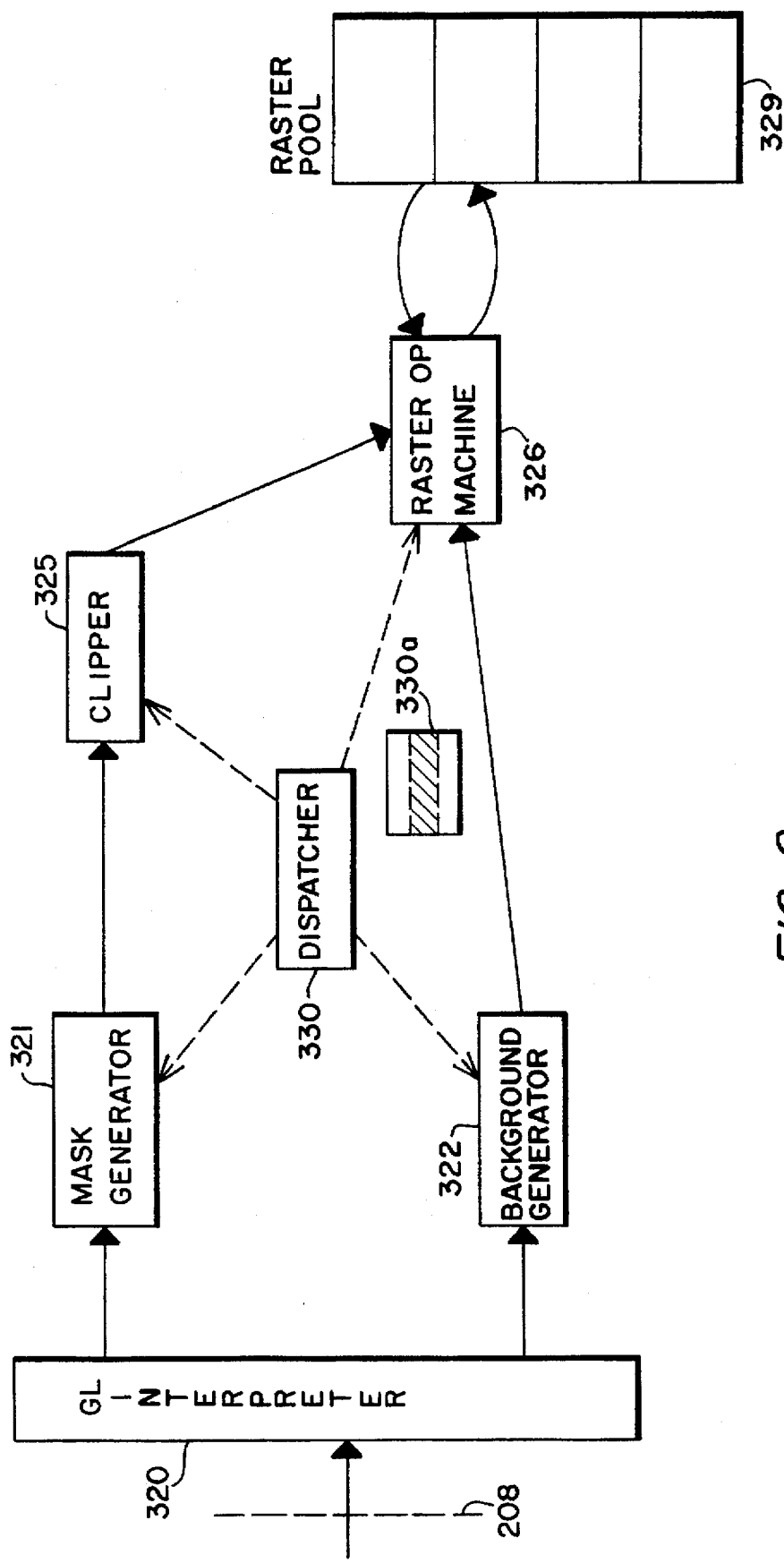

Thus, as shown in FIG. 8, dispatcher 330 is provided to coordinate the activities of the mask generator 321, clipper 325, background generator 322 and rasterOP machine 326. Specifically, dispatcher 330 instructs each of these modules to operate on a specific area of the raster image, such as area 330a. Typically, such an area is a band in a partitioned and banded area of bit map memory, but this is not necessarily the case, and the area may be any arbitrary area in the image. Dispatcher 330 serially sequences through the entire area, for example, from band to band, until the entire page in bit map memory has been rendered. Thus, dispatcher 330 causes mask generator 321, background generator 322, clipper 325 and rasterOP machine 326 to operate on sequential areas of bit map memory but to operate on only a single area at one time. Graphic language objects that are specified for other areas are temporarily ignored and are processed only at a later time when dispatcher 330 indicates that area should now be processed. Because of this, memory overhead may be necessary for the FIG. 8 structure to store temporarily the graphic language commands. The overhead may be minimized by insuring that the areas sequentially selected by dispatcher 330 are large enough so that the amount of graphic language commands that need to be stored is minimized.

Figure 9:
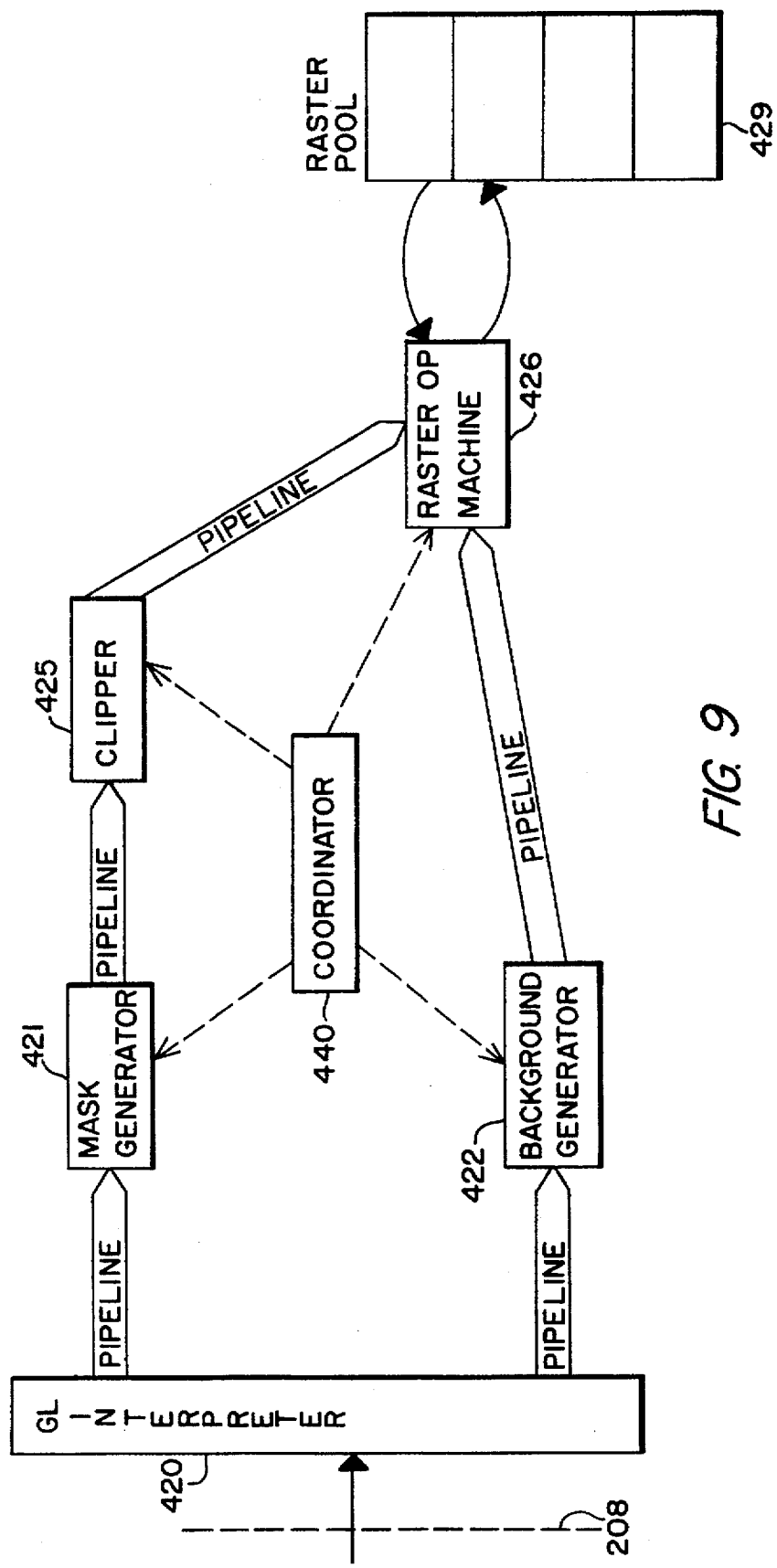

FIG. 9 shows another implementation of the graphic language processor in which a coordinator 440 is provided to coordinate a pipeline between mask generator 421, background generator 422, clipper 425 and rasterOP machine 426. Specifically, in the implementation shown in FIG. 9, each of the modules is a pipelined module designed to operate on whatever information is currently first available in its pipeline. Each module operates on its own pipelined instruction in parallel and at the same time as described generally in "Computer Architecture: A Quantitative Approach", D. A. Patterson and J. L. Hennessy, Chapter 6, Morgan Kaufman Publishing Company (1990). As such, coordinator 440 is provided to ensure that the modules start in synchronism and remain in synchronism throughout operation. Thus, for example, whereas background generator 422 will provide a background directly to rasterOP machine 426, mask generator 421 is not able to provide a corresponding mask object directly to the rasterOP machine because clipper 425 is interposed between mask generator 421 and rasterOP machine 426. Thus, coordinator 440 ensures that the clipped mask which is output by clipper 425 is associated with the proper background output from background generator 422 so that the rasterOP machine 426 operates on associated pieces of information.

The graphics language processor described hereinabove may be combined with other printer techniques such as that described in our co-pending application Ser. No. 07/898,532 filed Jun. 15, 1992, the contents of which are incorporated herein by reference as if set forth in full. In combination with the techniques described in that application, it is possible to translate the graphic language commands described herein into a further DART representation. The DART representation is susceptible of accurate modeling of printer resources whereby it is possible to determine before a printing operation commences whether there are sufficient printer resources to complete the printing operation. If there are sufficient resources available, then printer commences; on the other hand, if there are insufficient printer resources then the printer operation may be changed so as to ensure that the printing operation can be completed.

Figure 10:
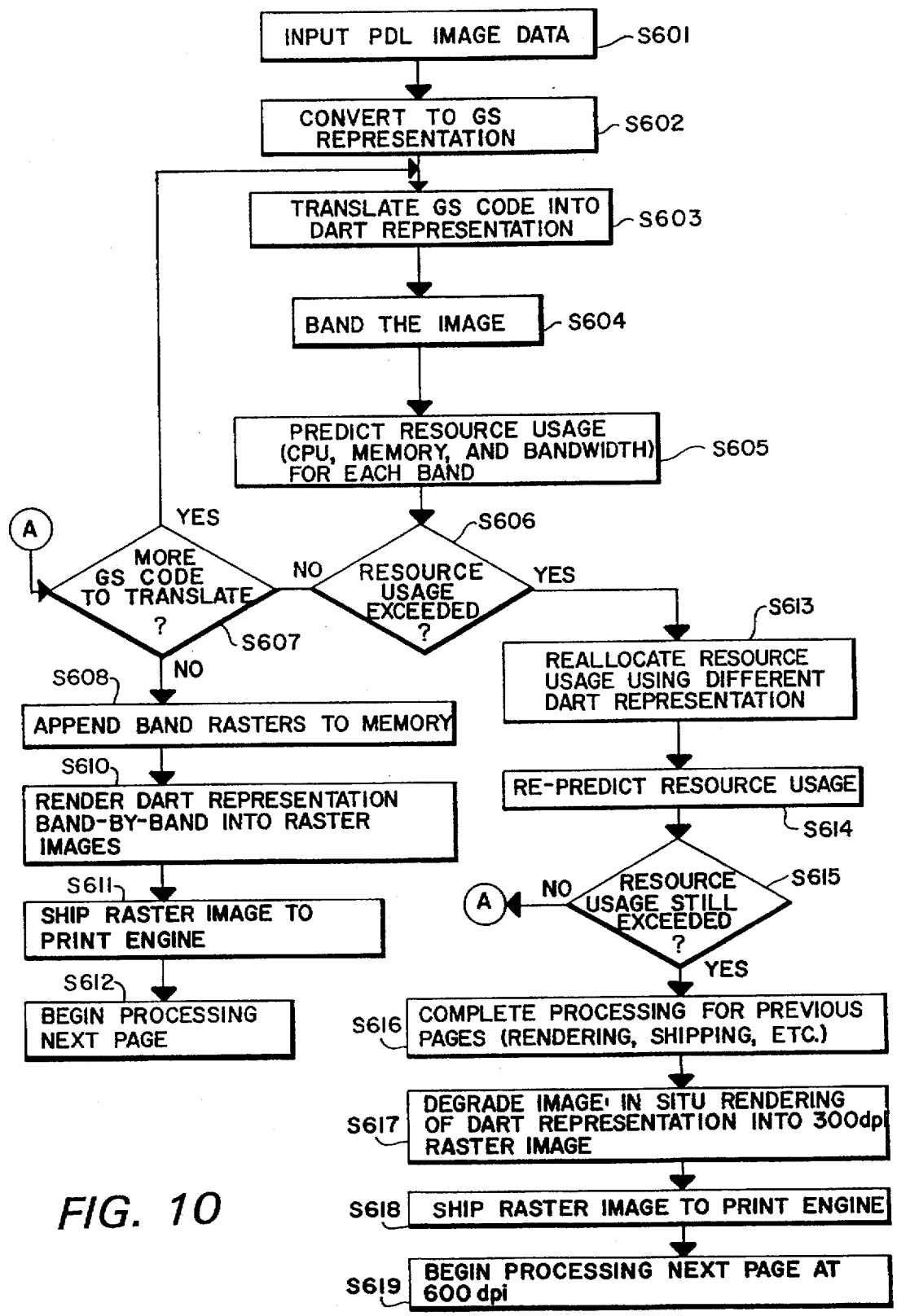
FIG. 10 is a flow diagram illustrating prediction and reallocation of printer resources.

FIG. 10, which is taken from 6(a) in the aforementioned application Ser. No. 898,532, depicts this process in more detail. The process steps in FIG. 10 are stored in an unshown memory in controller 11.

At step S601, controller 11 inputs image data from communication port 12. The image data is typically generated by an unshown host computer which sends the image data to controller 11 in a compact code such as a page description language.

At step S602, the PDL image data is translated into GS image data. At step S603, generator 42 generates a DART representation from the GS data and stores it in memory. As the DART representation is generated, it is banded in step S604, and in step S605 a running tally is maintained for resource usage that will be required in rendering the DART representation into a full raster image. Specifically, for each of the different DART representations, predictors are provided that predict (a) CPU power required to render the DART representation, and (b) memory required to store the DART representation. If printer 10 were equipped with external memory via a bandwidth-limited communication line, then a third predictor would be provided as to the bandwidth requirements for each DART representation.

The resources described here, namely CPU power, memory and bandwidth, are representative of the types of resources that printer 10 may be provided with. For each additional resource, corresponding predictor functions are likewise provided and used to tally resource usage.

Step S606 determines, based on the tally from the predictor functions, whether resource usage will be exceeded in rendering the DART representation for the current band in a full raster image in the band rasters. Step S606 may be executed periodically during DART generation, e.g. after each DART representation is generated, or it may be executed after the DART representation for the full band is generated. In the case of determining whether memory usage is exceeded by the DART representation, it is preferred to execute step S606 periodically, for example, every time a new DART object is created.

If step S606 determines that resource requirements to render the current band can be met, then flow advances to step S607 which determines whether there is additional GS code for the current page. If there is more GS code for the page, then flow returns to step S604 until the remaining image data has been processed.

When DART representations for all bands in the page have been generated, flow advances from step S607 to step S608 where a pair of blank band rasters are appended to the DART representation stored in memory. If flow has advanced to this step, then it is known that the resources available in the printer are adequate to render the DART representation band-by-band into a full raster image without the danger of exceeding printer resources, e.g. there is enough CPU power to avoid data underflow to the print engine.

In step S610, the DART representations are rendered band-by-band into alternating ones of the pair of band rasters, as described above. Then in step S611, the raster image is shipped to the print engine. Steps S610 and S611 are executed concurrently and sequentially so that as one band of raster image is shipped from one band raster, rendering of the next band of DART representation into the other band raster is completed.

It is also possible to provide more than two blank band rasters, in which case rendering of a fixed number of bands is completed.

After the current page has been printed, or as CPU time permits during rendering and shipping in steps S610 and S611, processing of the next page begins (step S612) in accordance with the overall flow shown in FIG. 10.

If step S606 determines that there are insufficient resources available in the printer, it is known that the resources needed to render or store the current DART representation exceed the resource envelope of the printer. Flow then advances to step S613 which performs resource trade-off or re-allocation in an attempt to fit the DART representation into the printer resource envelope. Initially, a different DART representation is selected for the offending band. For example, if the memory resource has been exceeded, then a memory-intensive DART representation may be replaced by a different representation which uses comparatively less memory. Likewise, if the CPU resource has been exceeded, then a CPU-intensive DART representation may be replaced by a different representation which uses comparatively less CPU. For example, the offending band may be pre-rasterized and stored in memory so that it is ready for printing by the print engine without any further CPU processing.

In step S614, resource usage with the different DART representations is re-predicted. If resource usage now falls within the resource envelope then flow proceeds to step S607 and continues as described above. If resource usage is still exceeded, then further attempts may be made to bring resource usage within the printer envelope (steps S613 and S614).

Alternatively, or in the case where it is not possible for the DART representation to be brought within the resource envelope, then the image is degraded prior to printing. Degrading automatically reduces resource requirements. In the example given here, the image is degraded by reducing the resolution (or pixel density) from 600 dpi to 300 dpi. Image degradation may take other forms: for a halftone image, degradation may also include reducing the number of grey levels; for a color image, degradation many also include reducing the number of colors.

In step S616, in preparation for resolution degradation processing is completed for all previous pages, that is, DART representations for prior pages are rendered and shipped as shown at steps S610 and S611.

In step S617, image resolution is degraded by rendering the DART representations that have already been generated. The DART representations are rendered in situ in memory but at the degraded resolution. Then, GS that has not already been processed is converted to a degraded raster image. The conversion is either direct into the degraded raster image or indirectly by first generating a DART representation and then rendering.

In step S618, the degraded raster image is shipped to the print engine. Preferably, when degradation is necessary, it should be complemented with some form of image enhancement so as to minimize the effects of degradation. For example, in the case of resolution degradation, smoothing circuitry such as that described in U.S. Pat. No. 4,878,068 may be employed at the time the degraded image is shipped so as to soften the appearance of the printed degraded image.

In step S619, processing for the next page begins but without degradation.

Steps S613 through S619 provide repetitive attempts to reallocate resource usage so that sufficient resources are available for the DART representation. In its simplest form of resource trade-off, however, and in the embodiment presently preferred, resource trade-off takes the form of immediate image degradation when it is determined that resources have been exceeded, whereby the color, grey scale or pixel density (or resolution) is degraded. In the case of a simple black and white image which is being rendered into a 600 dpi raster image, for example, resolution can be degraded to 300 dpi and a full raster image can be stored in memory. In this instance, the DART representation is converted in situ into a degraded- but-full raster image of the image data, whereupon the full raster image is shipped to the print engine. If desired, image smoothing techniques can be applied, such as those described in U.S. Pat. No. 4,878,068, so as to improve the appearance of the lower resolution image.

- 18 -

Appendix A

GRAPHIC LANGUAGE COMMANDS INSTRUCTION SET

This appendix is a summary of the GL commands instruction set. It defines instructions in terms of their effects on the system and semantic actions.

The notation below describes the stack manipulation the graphic processor performs when it executes an instruction:

Instruction $arg_1$ $arg_2$ ... $arg_n$ Instruction $result_1$ ... $result_k$ where the sequence $arg_1$ $arg_2$ ... $arg_n$ denotes the argument list on the stack (with $arg_n$ at the top) that the instruction consumes. Execution of the instruction replaces the argument list with the sequence $result_1$ ... $result_k$.

ARITHMETIC AND RELATIONAL OPERATIONS

Use these instructions to execute arithmetic and relational operations on the system stack.

add  $number_1$ $number_2$ gsop.add number (= $number_1$ + $number_2$)

Addition.

sub  $number_1$ $number_2$ gsop.sub number (= $number_1$ - $number_2$)

Substraction.

- 19 -

```
mul      number₁ number₂ gsop.mul number (= number₁ *
         number₂)
```

Multiplication.

```
div      number₁ number₂ gsop.div number (= number₁
         /number₂)
```

Division (integer).

```
mod      number₁ number₂ gsop.mod number (= number₁
         mod number₂)
```

Modulus.

```
neg      number gsop.neg number (= -number)
```

Arithmetic negate.

```
shright  number₁ number₂ gsop.shright number (=
         number₁ >> number₂)
```

Shift right.

```
shleft   number₁ number₂ gsop.shleft number (=
         number₁ << number₂)
```

Shift left.

OTHER ARITHMETIC/RELATIONAL INSTRUCTIONS

GL commands support a number of extended operations, including vector arithmetic (using fixed coordinates) and the necessary fixed arithmetic trigonometric functions (fast approximations).

STACK MANIPULATION

These operations handle the system stack.

- 20 -

```
loadq_0   gsop.loadq_0    num(=0)
loadq_1   gsop.loadq_1    num(=1)
loadq_2   gsop.loadq_2    num(=2)
loadq_3   gsop.loadq_3    num(=3)
loadq_4   gsop.loadq_4    num(=4)
loadq_5   gsop.loadq_5    num(=5)
loadq_6   gsop.loadq_6    num(=6)
loadq_7   gsop.loadq_7    num(=7)
```

Use the loadquick family of instructions to load very quickly the system stack with the most commonly used arithmetic values.

pop  *anyvalue* gsop.pop

Discards the top of the stack.

dup  *anyvalue* gsop.dup *anyvalue anyvalue*

Duplicates the top of the stack.

exch *anyvalue₁ anyvalue₂* gsop.exch *anyvalue₂ anyvalue₁*

Exchanges the top two cells in the stack.

OTHER STACK MANIPULATION INSTRUCTIONS

GL commands support a number of possible extension operations for handling the stack, including indexing, copying, etc.

RECORDS

Use records to store permanent information. The information in a record is structured as an array. Graphic language commands cause records to be stored as GL objects in GL object storage (see below).

The concept of a current record serves as a mechanism to compress GL code: Once an object is

- 21 - declared the current record, all load and store operations refer to that object.

At the beginning of each frame, the system provides a default record.

record    object|d| gsop.record

The object *object|d|* becomes the current record.

load     *displ* gsop.load

Pushes the contents of memory at record location *displ* onto the stack.

store    *value displ* gsop.store

Pops *value* on top of stack into record location *displ*.

ARRAY HANDLING

These instructions create arrays and access array elements on the stack.

OBJECT HANDLING

These instructions create and manipulate GL objects.

objdelete *objHandle* gsop.objdelete

Removes the object *handle* from memory.

objmake *objHandle size* gsop.objcopy

Performs a "delete" on the object *objHandle*, then creates a new object of size *size*.

- 22 -

```
markarray    gsop.markarray + n + b₁ + ... + bₙ
             inlineHandle markbitmap   gsop.markbitmap + n + b₁ + ... + bₙ
             inlineHandle marktrap     gsop.marktrap + n + b₁ + ... + bₙ
             inlineHandle markproc     gsop.markproc + n + b₁ + ... bₙ
             inlineHandle
```

These instructions declare an *inline* object, leaving an *inlineHandle* handle on the top of the stack for future reference.

```
objdef    inlineHandle objHandle gsop.objdef
```

Performs "delete" on the object *objHandle*, creates a new object of specified size, then copies the contents of *inlineHandle* onto the new object.

CONTROL

These instructions control the flow of execution for the GL processor.

```
call    executableArray gsop.call
```

Invokes the procedure denoted by the handle *executableArray*.

```
return    gsop.return
```

Returns executable flow back from the procedure currently executing. If the GL processor is not executing a procedure, this instruction finishes the current frame.

- 23 - if      bool execArray$_{true}$ gsop.if ifelse  bool execArray$_{true}$
        execArray$_{false}$ gsop.ifelse These operations conditionally execute the corresponding procedure according to the value of *bool* (0 means false, non zero means true).

loop    number execArray gsop.loop

The *execArray* is executed *number* times. A negative number produces an infinite loop.

break   gsop.break continue gsop.continue

Breaks or continues within the currently executed loop.

switch  number gsop.switch --

Switches to the program segment corresponding to the case value *number*. Case values are limited to the set $B=\{0..255\}$

CONTEXT HANDLING context  contextNumber gsop.context --

Sets the active context to *contextNumber*. There are a fixed number of possible contexts.

contexDef executableArray contextNumber
        gsop.contextDef

Defines context *contextNumber* as per procedure *executableArray*. Context procedures contain a switch statement that is used to map codes onto actions.

PROCEDURE DEFINITIONS

Procedures are simply executable arrays. A procedure handle is an array handle or an object handle.

SYSTEM SERVICES ACCESS

System services are accessed just like normal procedures, except that system procedure handles are part of a distinguished set.

MASK GENERATION

These instruction activate the primitive mask generators provided by GL.

Before activating any of the generators, a GL program must set the state information corresponding to the generator parameters.

PixelBit *bitmapHandle x y* gsop.PixelBit

Performs a pixelbit operation of *bitmapHandle* at position <*x,y*>.

Trapezoid*trapezoidHandle* gsop.Trapezoid

Activates the Trapezoid Mask Generator.

RLE    gsop.RLE

Activates the Run Length encoded Mask Generator.

- 25 -

LINE GENERATION MASKS

These instructions activate the mask generators for line rendering.

These masks generators use GL state variables to implicitly define position, line width, etc.

ACCESSING THE INPUT STREAM

Members of this class of primitives access the input stream, to create objects in the stack and/or the array stack.

getc1    gsop.getc1 num (= b1)

getc2    gsop.getc2 num (= (b1 << 8) + b2)

getc3    gsop.getc3 num (= (((b1 << 8) +b2) << 8) + b3)

getc4    gsop.getc4 num (= (((((b1 << 8) + b2) << 8) + b3) << 8) + b4)

Gets next 1 to 4 bytes (denoted b1, b2, b3 and b4) from the input stream and pushes them onto the stack as a scalar integer value.

BACKGROUND GENERATION image    a b c d e f image gsop.Image

Sets image as the background image array. The transformation [a b c d e f] denotes the mapping of raster pixels onto image array elements.

image    0 gsop.Image

- 26 -

Resets the background image array as empty.

gray    *grayLevel* gsop.gray

Sets the background to gray, of level *grayLevel*.

bgtile    *bitmapHandle* gsop.bgtile

Sets the background to be tiled by *bitmapHandle*.

bgmodify *offsetX offsetY rotation* gsop.bgtile

Modifies the background tile by shifting it <*offsetX, offsetY*> and rotating it by the amount specified in *rotation*.

STATE OPERATIONS screen    *objHandle* gsop.screen

Sets the dithering screen of *objHandle*.

clip *trapHandle* gsop.clip

Adds *trapHandle* to the clipping region.

clip 0 gsop.clip

Zeros the clipping region.

PRAGMATICS

The GL Interpreter ignores this class of instructions; pragmatics are for the use of other

- 27 - subsystems and/or tools (Debug module, Generation Libraries, etc.)

pragma gsop.pragma + {n} + $b_1$ + $b_2$ + ... + $b_n$

The GL Interpreter ignores the (n+2) bytes comprising this instruction. Use pragma as a comment, a synchronization tag for debugging purposes, a grouping tag, etc.

What is claimed is:

1. A printing method comprising the steps of:
   inputting coded print data;
   translating the coded print data into a first coded representation;
   translating the first coded representation into a second coded representation which is different from the first coded representation;
   predicting printer resources consumed in forming a raster image corresponding to the coded print data, said predicting step predicting consumption of printer resources based on the second coded representation;
   re-allocating printer resources in a case where printer resources are predicted by said predicting step to be exceeded; and
   forming a raster image from the second coded representation.

2. A method according to claim 1, wherein the coded print data is page description language print data and wherein the first and second coded representations are intermediate in complexity to the page description language and the raster image.

3. A method according to claim 1, wherein the first and second coded representations include plural coded primitives, and wherein all of the coded primitives of the second coded representation are the same as at least some of the coded primitives of the first coded representation.

4. A method according to claim 1, wherein the second coded representation is susceptible of accurate modelling such that usage of printer resources in said step of forming a raster image may be predicted accurately and wherein the first coded representation is not susceptible of such accurate modelling.

5. A printing apparatus comprising:
   inputting means for inputting coded print data;
   first translating means for translating the coded print data into a first coded representation;
   second translating means for translating the first coded representation into a second coded representation which is different from the first coded representation;
   predicting means for predicting printer resources consumed in forming a raster image corresponding to the coded print data, said predicting means predicting consumption of printer resources based on the second coded representation;
   re-allocating means for re-allocating printer resources in a case where printer resources are predicted by said predicting means to be exceeded; and
   forming means for forming a raster image from the second coded representation.

6. An apparatus according to claim 5, wherein the coded print data is page description language print data and wherein the first and second coded representations are intermediate in complexity to the page description language and the raster image.

7. An apparatus according to claim 5, wherein the first and second coded representations include plural coded primitives, and wherein all of the coded primitives of the second coded representation are the same as at least some of the coded primitives of the first coded representation.

8. An apparatus according to claim 5, wherein the second coded representation is susceptible of accurate modelling such that usage of printer resources by said forming means may be predicted accurately and wherein the first coded representation is not susceptible of such accurate modelling.

* * * * *